United States Patent [19]
Oliver et al.

[11] Patent Number: 6,026,103
[45] Date of Patent: Feb. 15, 2000

[54] GAS DISCHARGE LASER WITH ROLLER BEARINGS AND STABLE MAGNETIC AXIAL POSITIONING

[75] Inventors: I. Roger Oliver; Igor V. Fomenkov, both of San Diego; William N. Partlo, Poway, all of Calif.

[73] Assignee: Cymer, Inc., San Diego, Calif.

[21] Appl. No.: 09/290,852

[22] Filed: Apr. 13, 1999

[51] Int. Cl.[7] ........................................ H01S 3/00
[52] U.S. Cl. ................. 372/37; 372/57; 372/61; 372/65
[58] Field of Search ................. 372/57, 61, 37, 372/59, 65

[56] References Cited

U.S. PATENT DOCUMENTS

5,023,884  6/1991  Akins et al. ............................ 372/57
5,848,089  12/1998  Sarkar et al. ............................ 372/57

*Primary Examiner*—Leon Scott, Jr.
*Attorney, Agent, or Firm*—John R. Ross, Esq.

[57] ABSTRACT

An electric discharge gas laser having a laser cavity in which is contained a laser gas and a fan for circulating the laser gas. The fan is supported in position radially by a roller bearing system and axially at least in part by magnetic forces. In a preferred embodiment the magnetic forces are supplied by a brushless DC motor in which the rotor of the motor is sealed within the gas environment of the laser cavity and the motor stator is located outside the gas environment. The magnetic center of the rotor is offset from the center of the stator to produce a magnetic reluctance generated force on the shaft that acts axially on the shaft toward the non-drive end and is reacted by a ball and plate bearing assembly mounted along the axis of rotation at the opposite end of the shaft.

9 Claims, 8 Drawing Sheets

GAS DISCHARGE LASER WITH ROLLER BEARINGS AND STABLE MAGNETIC AXIAL POSITIONING

This invention relates to gas lasers and, in particular, to high repetition rate electric discharge gas lasers.

BACKGROUND OF THE INVENTION

Electric Discharge Gas Lasers

Electric discharge gas lasers are well known and have been available since soon after lasers were invented in the 1960s. A high voltage discharge between two electrodes excites a gaseous gain medium. A resonance cavity containing the gain medium permit stimulated amplification of light which is then extracted from the cavity in the form of a laser beam. These electric discharge gas lasers may be operated in a continuous or pulse mode.

Excimer Lasers

Figure 1:
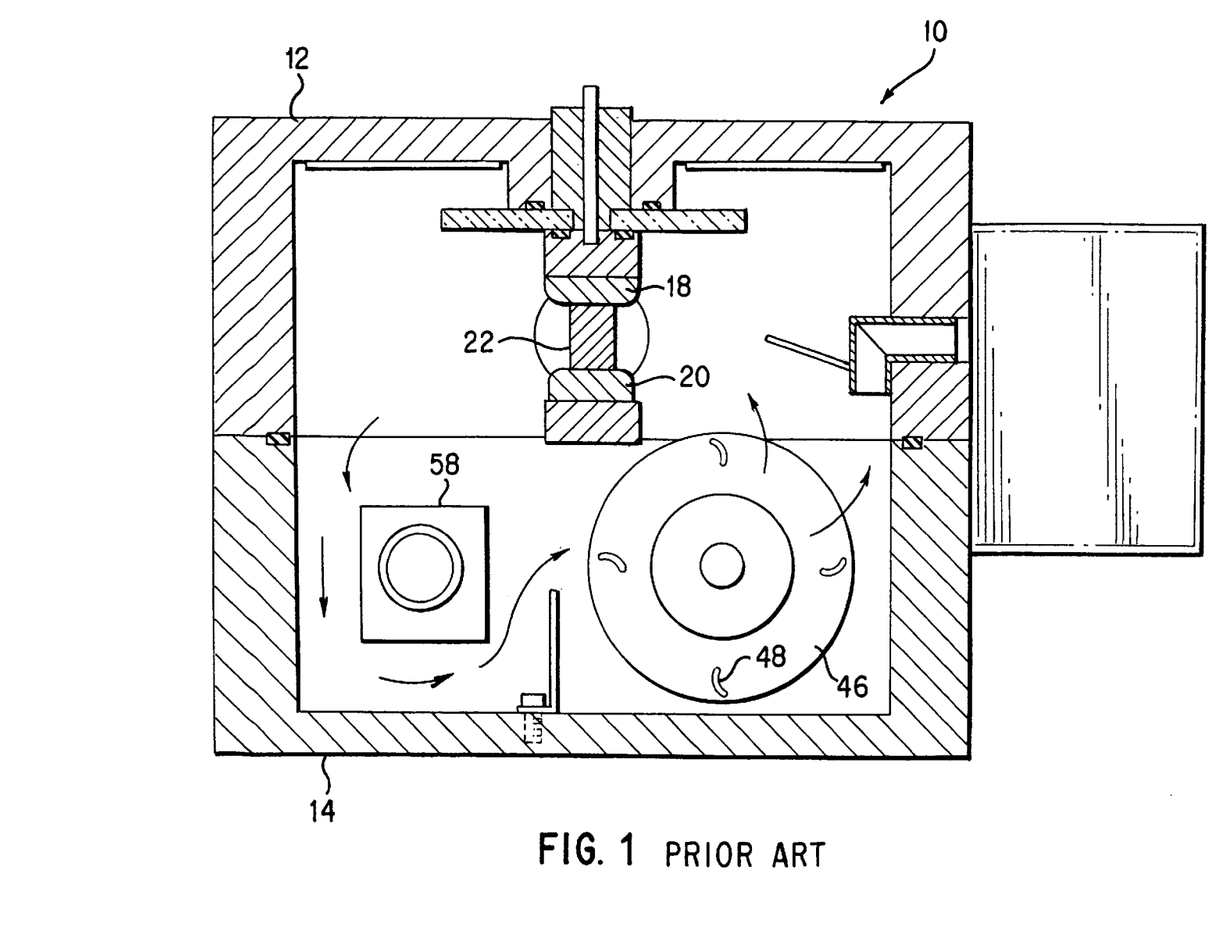
FIG. 1 shows a prior art laser system.
Figure 2:
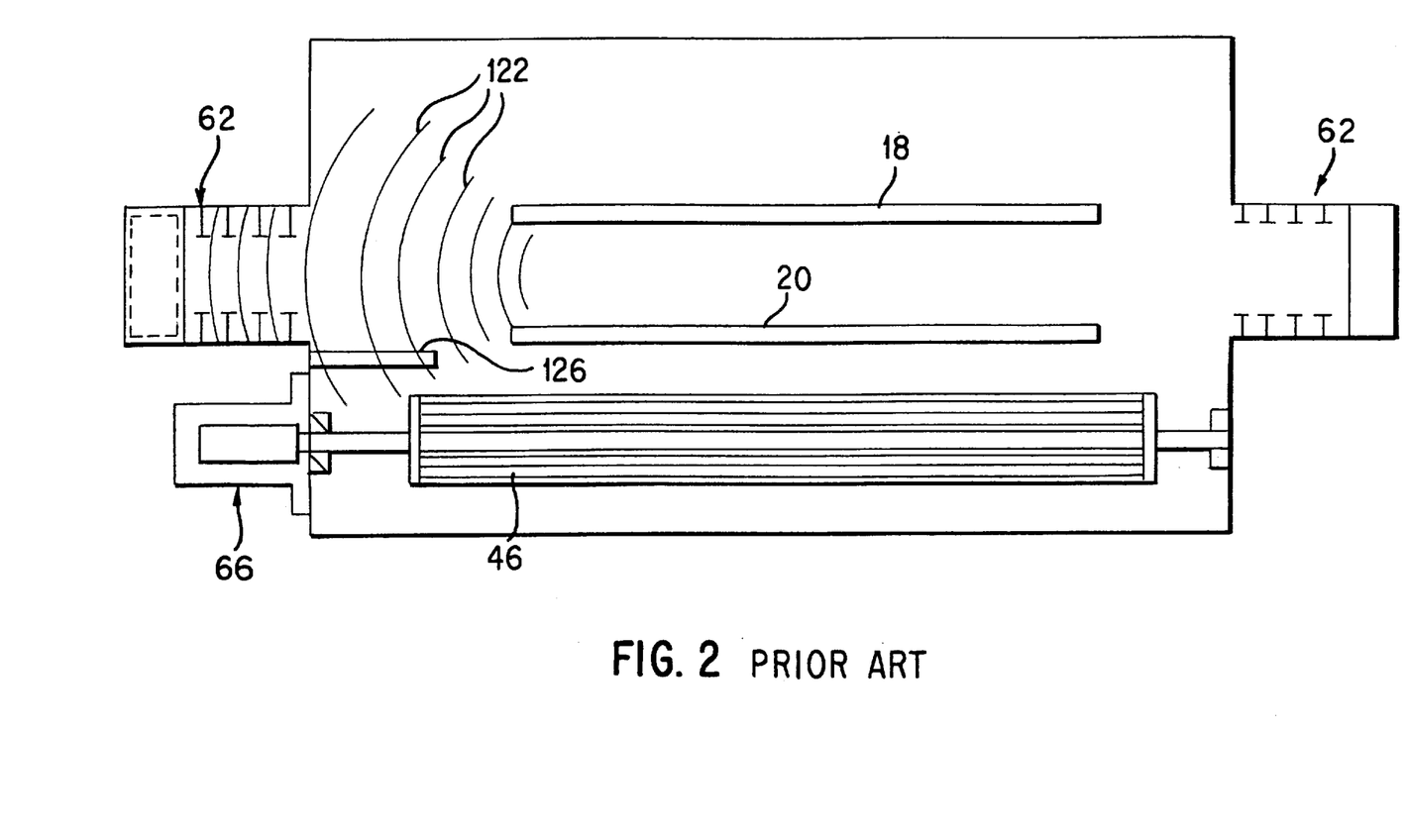
FIG. 2 shows the location of a squirrel cage fan in the FIG. 1 laser.
Figure 3:
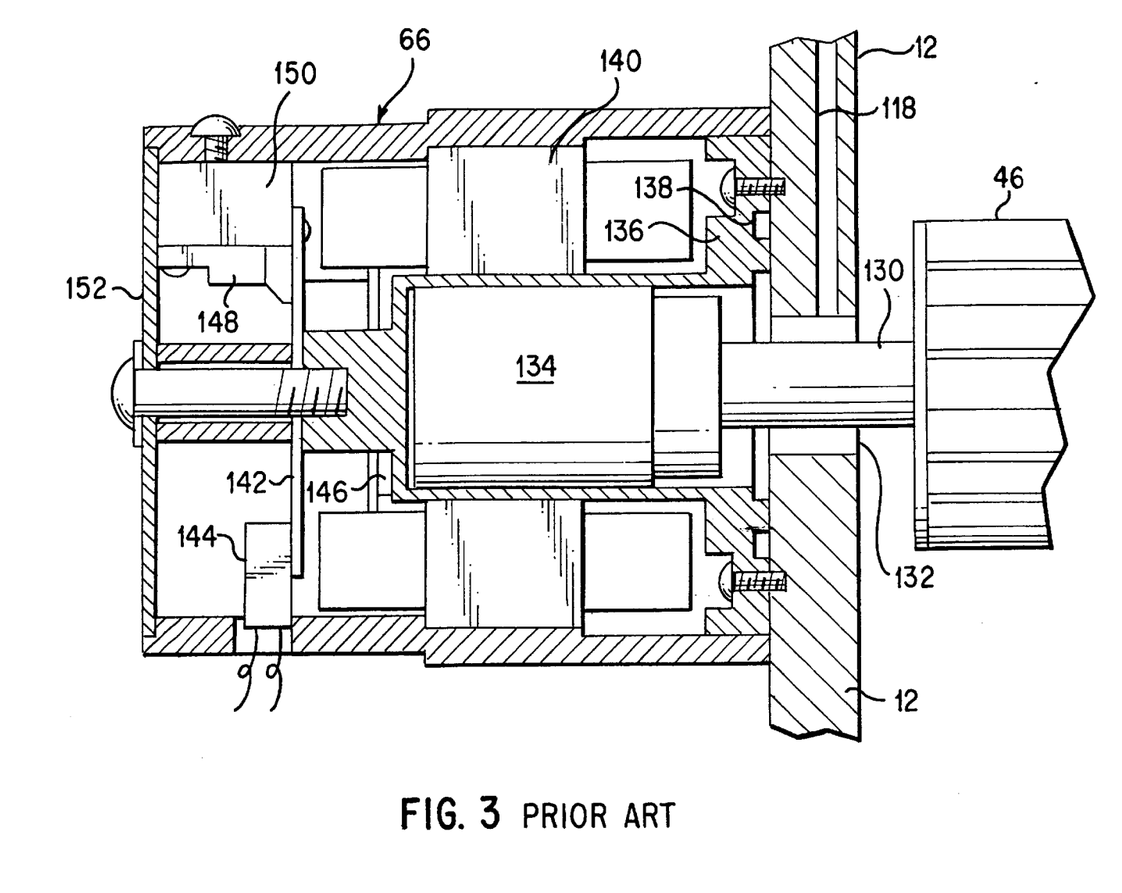
FIG. 3 shows a prior art brushless DC motor for driving the fan.

Excimer lasers are a particular type of electric gas discharge laser and have been known as such since the mid 1970s. A description of an excimer laser, useful for integrated circuit lithography, is described in U.S. Pat. No. 5,023,884 issued Jun. 11, 1991 entitled "Compact Excimer Laser." This patent has been assigned to Applicants' employer, and the patent is hereby incorporated herein by reference. The excimer laser described in Patent '884 is a high repetition rate pulse laser. The principal elements of the laser 10 are shown in FIG. 1 which correspond to FIG. 1 in Patent '884. The discharges 22 are between two long (about 23 inches) electrodes 18 and 20 spaced apart by about ⅝ inch. Repetition rates of prior art lasers, like the one described, are typically within the range of about 100 to 1000 pulses per second. These high repetition rate lasers are usually provided with a gas circulation system which replaces the gas in the region between the electrodes between each pulse. In the above referred to laser, this is done with a long squirrel-cage type fan 46, having blades 48 as shown in FIG. 1 and FIG. 2 which is FIG. 7 in Patent '884. The fan is slightly longer than the electrodes 18 and 20 and provides sufficient circulation so that at pulse rates between 100 to 1000 Hz, the gas between the electrodes is cleared between pulses. The shaft 130 of fan 46 is supported by two bearings 132 as shown in FIG. 3 which is FIG. 9 of Patent '884. The gas used in the laser contains fluorine which is extremely reactive. The fan rotor driving fan shaft 130 is sealed, within the same environmental system provided by housing structure members 12 and 14, by sealing member 136 as explained at column 9, line 45 of Patent '884, and the motor stator 140 is outside sealing member 136 and thus protected from the corrosive action of the fluorine gas. However, bearing 132 is subjected to the corrosive action of the chamber gas as is any lubrication used in the bearing. Corrosion of bearing and bearing lubrication can contaminate the gas.

What is Needed

There is a need to increase the pulse repetition of gas discharge lasers, including the type of excimer lasers described in U.S. Patent '884 and a corresponding need for higher fan speed. This increases the burden on fan shaft bearings, requiring better bearings and more powerful fan motors. There is also the need to reduce sources of contamination in high repetition rate gas discharge lasers.

SUMMARY OF THE INVENTION

The present invention provides an electric discharge gas laser having a laser cavity in which is contained a laser gas and a fan for circulating the laser gas. The fan is supported in position radially by a roller bearing system and axially at least in part by magnetic forces. In a preferred embodiment the magnetic forces are supplied by a brushless DC motor in which the rotor of the motor is sealed within the gas environment of the laser cavity and the motor stator is located outside the gas environment. The magnetic center of the rotor is offset from the magnetic center of the stator to produce a magnetic reluctance generated force that acts axially on the shaft toward the non-drive end and is reacted there by a ball and plate bearing assembly mounted along the axis of rotation.

DETAILED DESCRIPTION OF PREFERRED EMBODIMENT

Preferred embodiments of the present invention can be described by reference to the drawings.

First Preferred Embodiment

Shaft Positioning

Figure 4:
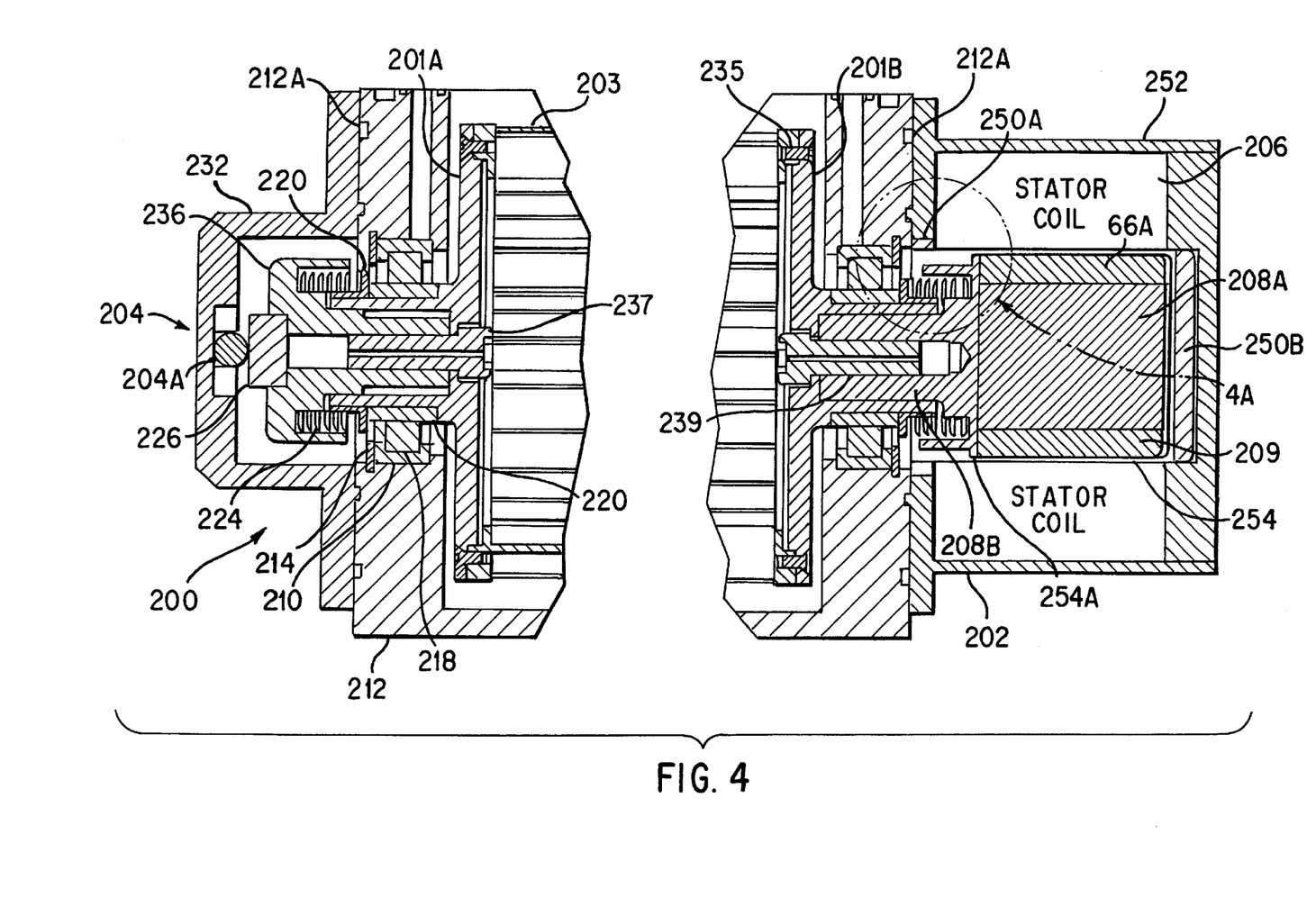
FIG. 4 is a drawing of a preferred embodiment of the present invention.
Figure 4A:
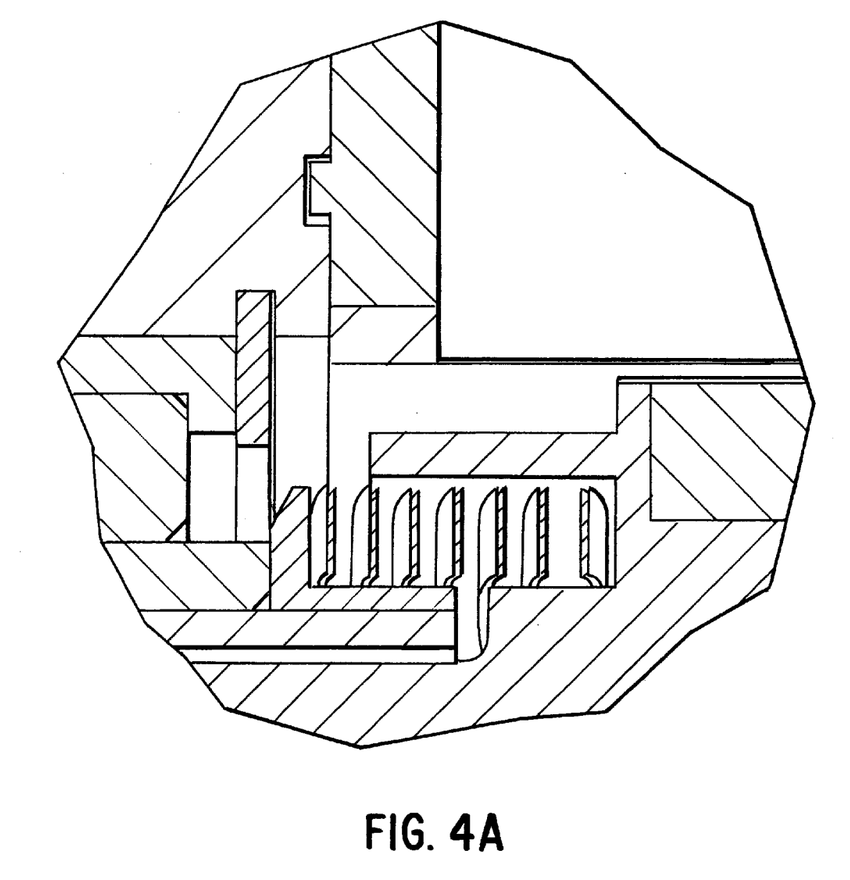
FIG. 4A shows a cut out section of the embodiment shown in FIG. 4.
Figure 5:
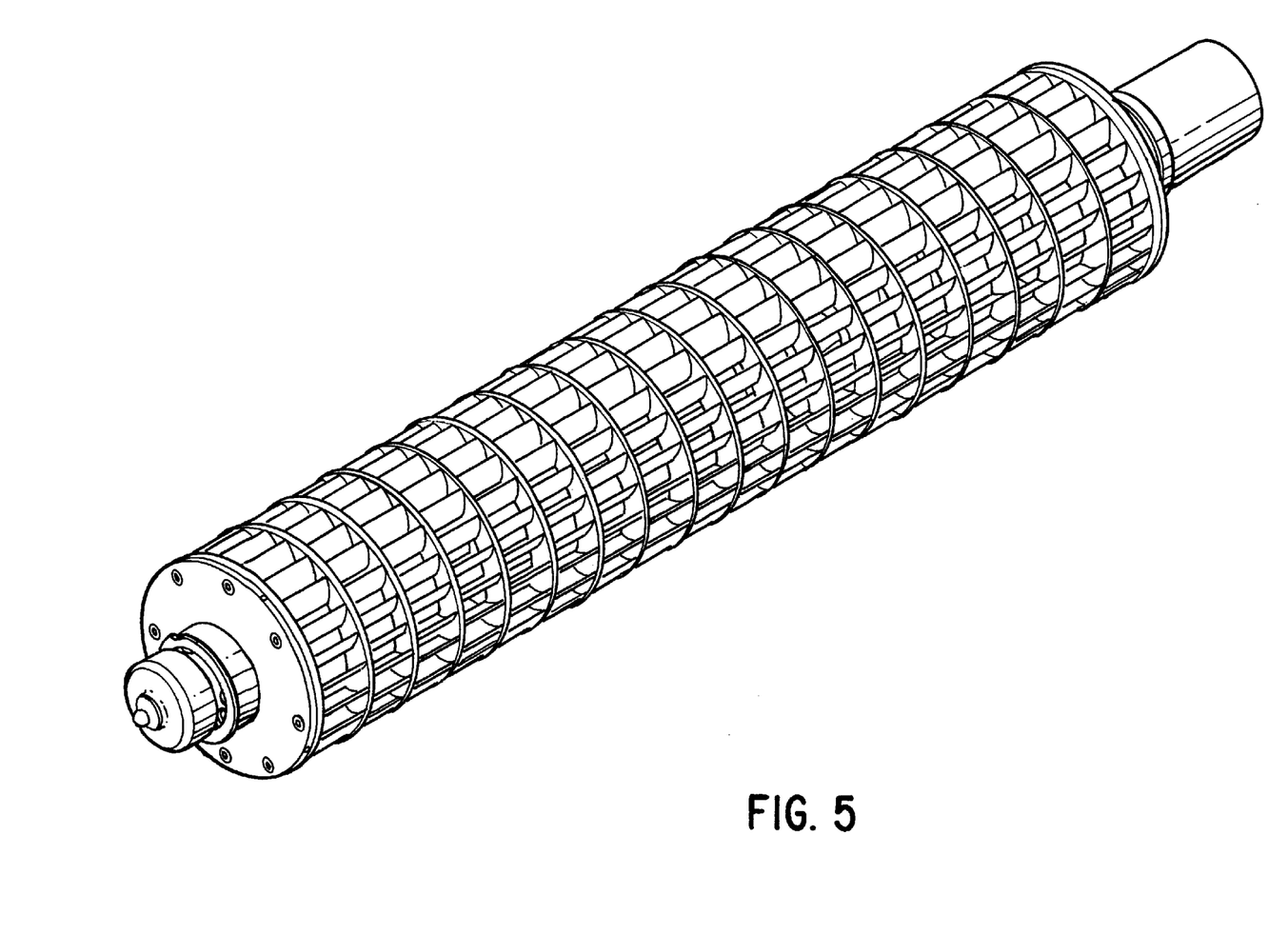
FIG. 5 is a prospective drawing showing the fan blade structure, the rotor and bearing assembly of the above preferred embodiment.
Figure 6:
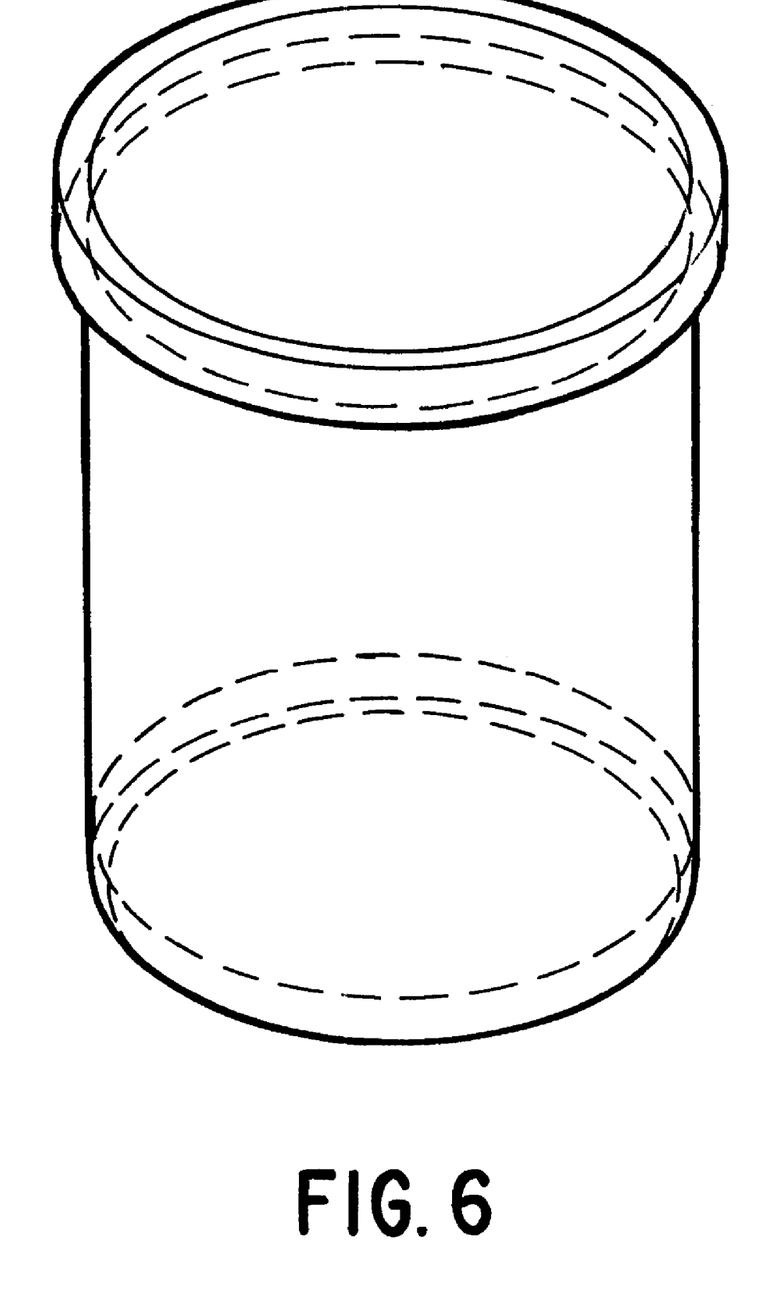
FIG. 6 is a prospective drawing of a very thin wall monel cap which seals the motor stator from laser gas in a preferred embodiment.

The important elements of a preferred embodiment of the present invention are shown in FIGS. 4, 5 and 6. FIG. 4 shows a cross section view along the axis of a fan assembly of gas discharge laser chamber of the type shown in FIG. 1. In this preferred embodiment the fan motor 66A drives a fan shaft 201 consisting of shaft structures 201A and 201B which are bolted to squirrel cage cross flow fan structure 203 which is supported radially by roller bearing assemblies 200 and 202. Axial positioning is provided by ball bearing assembly 204 aligned with the shaft axis and an axial magnetic force produced by stator coil 206 on rotor 208 caused by the radially positioned rotor magnets 209 being axially aligned with its axial magnetic center slightly off center of the magnetic fields produced by the stator coil.

Roller Bearings

In this preferred embodiment roller bearing assembly 200 is comprised of outer race 210 made from a ceramic material (such as zirconium oxide) which is held in position axially within chamber wall 212 by precision retaining rings such as Seeger circlips 214 mounted in chamber wall 212. Shoulders of outer race 210 hold cylindrical rollers 218 in their proper axial position. Inner race 220 is elongated to allow axial movement of shaft 201 relative to chamber walls 212 due to transient and unequal thermal expansion or contraction. Inner race 220 preferably comprised of the same material is held in its proper position on shaft 201 by bearing washer 222 and race clamp spring 224. Bearing assembly 202 supporting shaft 201B at the drive end of the shaft contains the same elements as bearing assembly 200.

Roller bearings take advantage of a thin line type contact between rolling elements and races (as compared with a small point type contact in ball bearings) and typically have very high load capacity as compared to ball bearings. Since wear is a strong function of stress it follows that a design using such bearings with relatively light loads should result in a very long service life for the bearings.

The bearings, as indicated above, are preferably manufactured from ceramic materials (zirconium oxide races/ silicon nitride rolling elements) and are sized conservatively to run without lubrication. Dry running ceramic bearings are becoming common in demanding applications where lubricants are not permitted for contamination reasons or because temperatures are too high.

Cylindrical roller bearings have no capacity for axial loads. However, this application does not generate primary axial service loads, but small axial loads do occur due to motor misalignments and structural dynamics of the rotating system.

Thrust Bearing

A zirconia bearing plate 226 is positioned on the shaft axis at the axial bearing end of the shaft. This plate mates with zirconia ball 204A which is a part of thrust bearing assembly 204 fitted into end cap 232 which is aligned with a spigot and bolted to chamber wall 212. This thrust bearing assembly is capable of supporting large forces and providing extremely long life. The materials are very resistant to the very corrosive laser gas of the type used in excimer lasers.

Reluctance Centering Magnetic Axial Thrust Force

Shaft 201 is held axially against ball 204A of bearing assembly 204 by a magnetic force created by stator coil 206 on rotor 208 which is positioned so that the axial center of rotor 208 (as defined by the magnetic and geometric axial mid point of six samarium cobalt magnets 209) is located less than 5 millimeters farther from the ball bearing end of shaft 201 than the magnetic and geometric axial center of stator coil 206. Since the normal magnetic forces in brushless motor drive 66A tend to align the rotor axially in the center of stator coil 206 a relatively constant axial magnetic force is applied to the shaft in the direction of the ball bearing end of the shaft at all speeds of rotation. At operating speeds normal for this design (about 5000 rpm) the axial force produced on the off center rotor equals about 3 pounds. We will refer to the end of the shaft where axial bearing is located as the non-driven end and the other end where the rotor is located as the driven end. This axial force is sufficient to hold the shaft against ball 204A in ball bearing assembly 204.

Other Features of First Preferred Embodiment

Other important features of the first preferred embodiment can be recognized by reference to FIGS. 4, 5 and 6. In this preferred embodiment the blower blade structure 203 is a 36 blade, squirrel cage type cross flow blower. The blades 236 are 26 inches in the axial direction and the diameter of the blade structure is 5 inches as compared to 3.25 inches for prior art blower blades. Shaft structures 201A and 201B are bolted to blade structure 203 with bolts 235. This preferred embodiment is designed to provide sufficient flow for 5000 pulse per second operation. The motor will produce about 5 kw (6.7 hp) and the blower unit is designed to operate at 5000 rpm as compared to 3000 rpm of a prior art 3.25 inch blade structure utilized for a 2000 pulse per second laser. Bearing mounting shaft 236 which accommodates the shaft portion of both the axial bearing assemble and the roller bearing assembly at the axial bearing end of shaft 201 is attached to shaft structure 201A with ⅜ inch bolt 237 and aligned with a key or other torque transmission feature on the end of the shaft (not shown). Similarly shaft structure 201B is attached to rotor 208 by bolt 239 and aligned with a similar feature.

Since this preferred embodiment is designed to be part of an excimer laser in which the laser gas comprises about 0.1% fluorine which makes the gas extremely corrosive to most materials, both the stator and the rotor are protected by nickel alloy 400 cans (such as Monel). The stator can 250 is shown in perspective in FIG. 6. The can has an extremely thin (0.005 inch thickness) wall 250C but thicker lip 250A and thicker bottom 250B. The walls preferably are as thin as possible so as to minimize power and thus heat losses in the motor but thick enough to assure pressure containment and isolation of the stator from the laser gas. The lip 250A is electron beam welded to motor cap 252 as indicated on FIG. 4 to seal stator coil 206 away from the laser gas within motor cap 252. A very thin wall (preferably 0.005 inch) monel cup 254 is fitted over the core 208A of rotor 208 and electron beam welded at circumference 254A after the rotor has been precisely machined into a matching cylindrical shape. As with the stator cup, wall thickness is very important to motor efficiency and thermal management but isolation of the rotor is also important due to the magnet and rotor core materials incompatibility with the laser gas. The core 208A of rotor 208 is comprised of a magnetic stainless steel (such as 430 stainless steel) and 6 samarium cobolt magnets. The rotor mounting shaft 208B is comprised of nickel alloy 400 (monel) and the two parts are friction welded together.

Assembly Procedure

Described below is a preferred assembly procedure for assembling the blower into its laser chamber.

1. Heat bare bottom portion of laser chamber 14 to 150° C. and mount the ceramic outer races of radial bearings in the chamber walls. Retain with precision retaining rings or similar device and allow the chamber to cool.
2. Assemble the ceramic rolling elements, rolling element cages, ceramic inner races and shields to complete the bearing assembly.
3. Heat the plate bearing mounting shaft 236 to 150° C. and mount the ceramic plate bearing. Allow the shaft to cool.
4. Mount shaft structure 201A from the inner wall of the chamber and assemble the plate bearing shaft 236 bearing washer and race clamping spring. Fasten with ⅜" bolt 237.
5. Mount the shaft structure 201B from the inner wall of the chamber and assemble the motor rotor, bearing washer and race clamping spring. Fasten with ⅜" bolt 239.
6. Push both shafts carefully toward their respective chamber wall until they make contact with the wall. Lower the blower blade structure 203 into the chamber and mount on shaft locating spigots. Fasten the fan to the shafts with eight 6–32 countersunk screws 235 at each end. A closable aperture may be provided in the chamber wall to gain access to the fastener heads.
7. Heat the end cap 232 to 150° C. and mount the ceramic ball bearing assembly. Allow the cap to cool.
8. Fit an end cap seal in the chamber wall. Mount the end cap to the chamber wall. Tighten end cap with bolts (not shown).
9. Fit a tin coated inconel seals seal in grooves 212A. Move the fan assembly toward the driven end until the shaft bulkhead makes contact with the chamber wall. Hold the fan assembly securely in this position and mount the motor. The magnetic forces will tend to pull the shaft toward the motor end until the center point is reached at which point the force will reverse. Allow the fan assembly to move gently toward the axial bearing and until the ceramic ball is in contact with the ceramic plate. Fasten the motor by tightening the fasteners.

Figure 7:
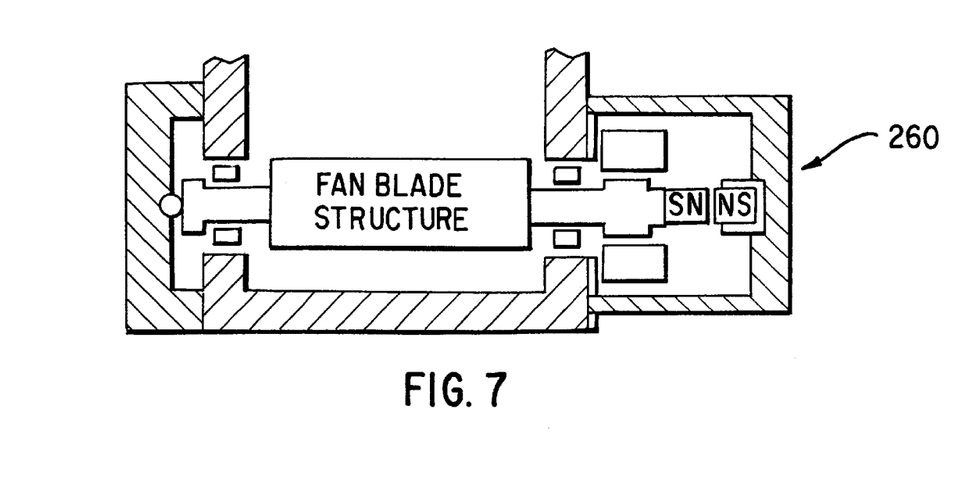
FIGS. 7 and 8 are drawings showing other preferred embodiments of the present invention.
Figure 8:
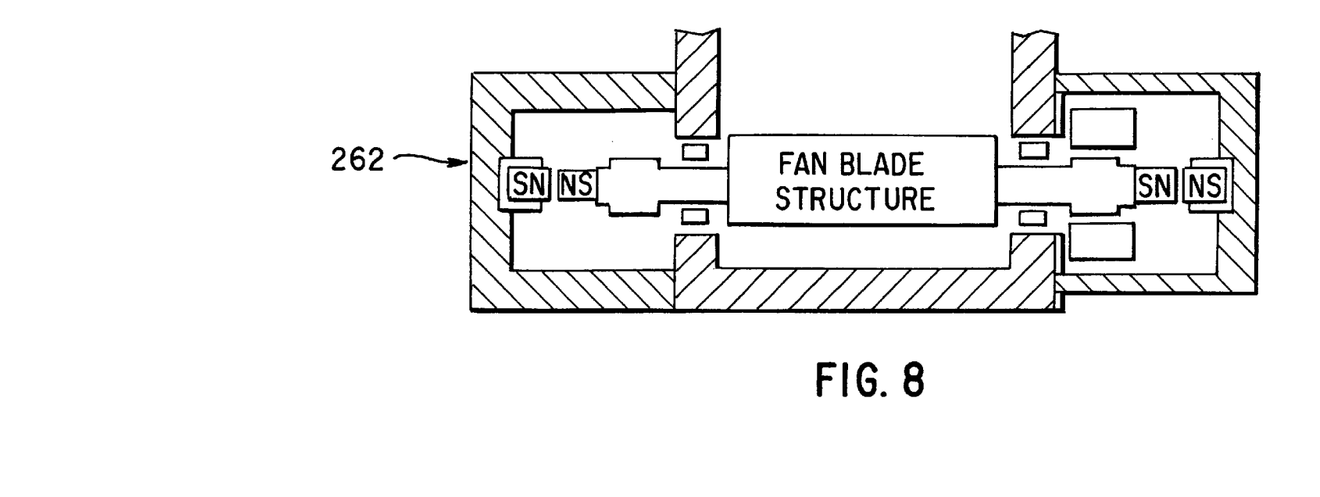

While the invention has been described in connection with what is presently considered to be the preferred embodiments, it is to be understood that the invention is not limited to the disclosed embodiments, but on the contrary, covers various modifications and equivalents included within the spirit and scope of the following claims. For example, as shown in FIG. 7 two magnets could be mounted axially at the motor end of the shaft to provide the axial magnetic force provided by the stator coil on the rotor in FIG. 4. The remainder of the system is substantially the same as shown in FIG. 4 with two radial cylindrical roller bearings and the ball type thrust bearing at one end of the shaft. The opposing magnets are shown at 260 in FIG. 7. FIG. 8 shows an embodiment like that shown in FIG. 7 except the ball type thrust bearing is replaced by a set of oppositely positioned magnets aligned with the shaft axis as shown at 262 in FIG. 8.

That which is claimed is:

1. An electric discharge gas laser comprising:
   A. a housing structure having walls forming an internal laser cavity;
   B. a gas located within the laser cavity to define a gas environment, said gas being capable of lasing action;
   C. a pair of elongated spaced electrodes located within the laser cavity and forming an electrical discharge region between the electrodes for stimulating gas within the discharge region to lasing action in accordance with an electrical discharge between the electrodes;
   D. a rotating fan, having a shaft defining a shaft axis, located within the laser cavity for circulating the gas through the discharge region;
   E. at least two cylindrical roller bearings providing radial support to said shaft but no axial support for said shaft;
   F. a brushless DC motor comprising a stator defining a stator axial reluctance center, and a rotor defining a rotor axial reluctance center, for providing rotation to the fan, said rotor of said motor being coupled directly or indirectly to said shaft;
   G. a magnetic means for providing a magnetic axial force for axially positioning said shaft; and
   H. at least one sealing member interposed between said rotor and said stator to seal said rotor within the gas environment and to seal the stator outside the gas environment;

wherein radial support for said shaft is provided by said roller bearings and axial positioning of said shaft is provided by said magnetic means.

2. A laser as in claim 1 wherein said magnetic means comprises a ball type thrust bearing aligned with said axis at a first end of said shaft and said magnetic force is provided by offsetting said rotor with respect to said stator so that the rotor axial magnetic center is farther from said thrust bearing than the stator axial magnetic center.

3. A laser as in claim 1 wherein said magnetic means comprises a ball type thrust bearing aligned with said axis at a first end of said shaft and two opposing magnets at a second end of said shaft one of said magnets being mounted on said shaft and the other mounted fixedly with respect to said structure to force said shaft axially against said thrust bearing.

4. A laser means as in claim 1 wherein said magnetic means comprises a set of oppositely polarized magnets aligned at each end of said shaft one magnet of each set mounted on and rotating with said shaft and one magnet of each set mounted fixedly with respect to said structure.

5. A laser as in claim 1 wherein said gas comprises a halogen and a buffer gas.

6. A laser as in claim 5 wherein said halogen is fluorine, said buffer gas is neon.

7. A laser as in claim 6 wherein said gas further comprises krypton.

8. A laser as in claim 6 wherein said gas further comprises argon.

9. A laser as in claim 6 wherein said gas further comprises a gas chosen from a group consisting of krypton and argon.

* * * * *